(12) United States Patent
Patel

(10) Patent No.: US 8,756,047 B2
(45) Date of Patent: Jun. 17, 2014

(54) METHOD OF ARTIFICIAL NUERAL NETWORK LOADFLOW COMPUTATION FOR ELECTRICAL POWER SYSTEM

(76) Inventor: Sureshchandra B Patel, Toronto (CA)

( * ) Notice: Subject to any disclaimer, the term of this patent is extended or adjusted under 35 U.S.C. 154(b) by 214 days.

(21) Appl. No.: 12/923,525

(22) Filed: Sep. 27, 2010

(65) Prior Publication Data
US 2012/0078436 A1    Mar. 29, 2012

(51) Int. Cl.
*G06G 7/54* (2006.01)
(52) U.S. Cl.
USPC .................................. 703/18; 706/16; 706/25
(58) Field of Classification Search
USPC ............... 703/18; 702/60; 700/286, 295, 297
See application file for complete search history.

(56) References Cited

U.S. PATENT DOCUMENTS

| | | | | |
|---|---|---|---|---|
| 5,081,591 | A * | 1/1992 | Hanway et al. | 323/205 |
| 5,625,751 | A * | 4/1997 | Brandwajn et al. | 706/20 |
| 7,769,497 | B2 * | 8/2010 | Patel | 700/298 |
| 7,788,051 | B2 * | 8/2010 | Patel | 702/60 |
| 8,200,372 | B2 * | 6/2012 | Joos et al. | 700/292 |
| 2007/0203658 | A1 * | 8/2007 | Patel | 702/60 |
| 2009/0113049 | A1 * | 4/2009 | Nasle et al. | 709/224 |
| 2012/0089264 | A1 * | 4/2012 | Patel | 700/292 |

OTHER PUBLICATIONS

Repo, "On-line Voltage Stability Assessment of Power System—An Approach of Black-box Modelling", Doctoral dissertation, Tampere University of Technology, 2001, 174 pages.*

* cited by examiner

*Primary Examiner* — Omar Fernandez Rivas
*Assistant Examiner* — Herng-Der Day

(57) ABSTRACT

ANN Loadflow Computation Method (LCM) is invented involving input vector composed of net nodal injected real power (P), reactive power (Q), and diagonal elements of conductance and susceptance matrices multiplied by squared initial guess node voltage magnitude (V) or sum of its squared real and imaginary components. Training, and testing and validating input data sets/vectors are generated by applying uniform and non-uniform scaling factors applied to base case loads P and Q at PQ-nodes, and resistance and reactance of network branches. These scale factors are increased until Loadflow Solution by a conventional LCM diverges due to V or angle (θ) instability. V and θ values in the solution just before divergence are respective stability limits, and corresponding values in Loadflow Solution provide direct measure of respective stability margins. Suresh's diakoptics based feature selection technique is presented for calculating one node variable with one neuron in each of ANNs output layers.

21 Claims, 9 Drawing Sheets

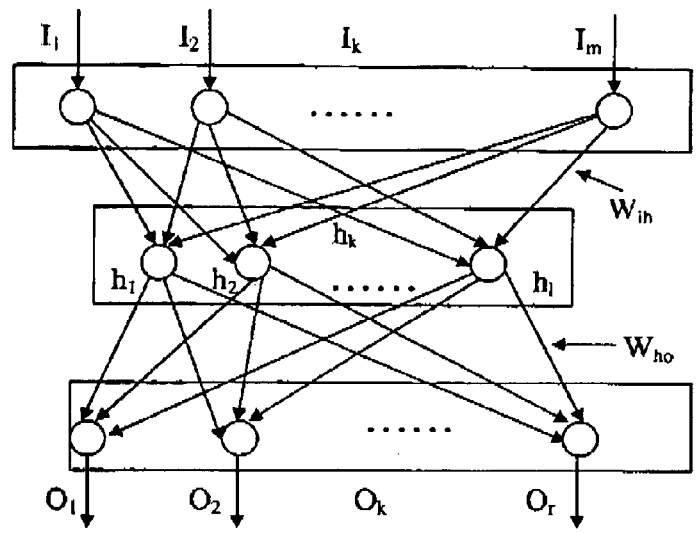
Fig.1: Prior Art
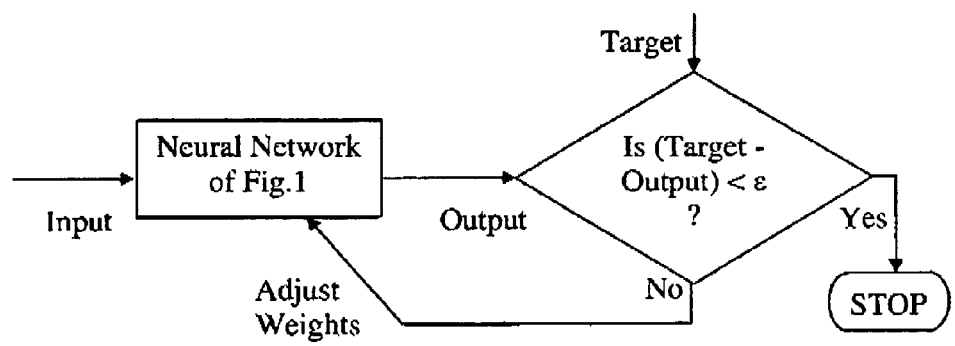
Fig.2: PriorArt

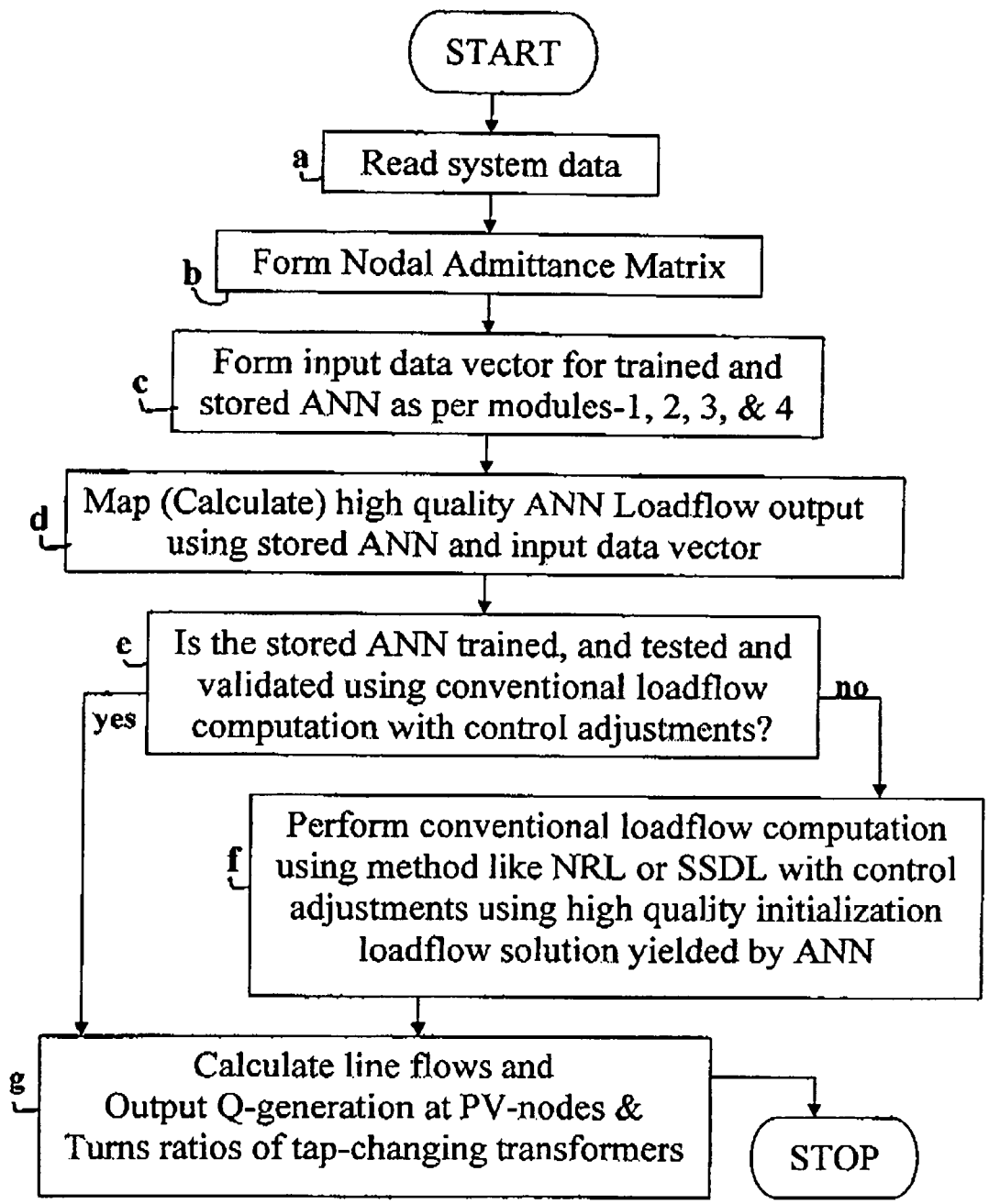
Fig.3: Prior Art

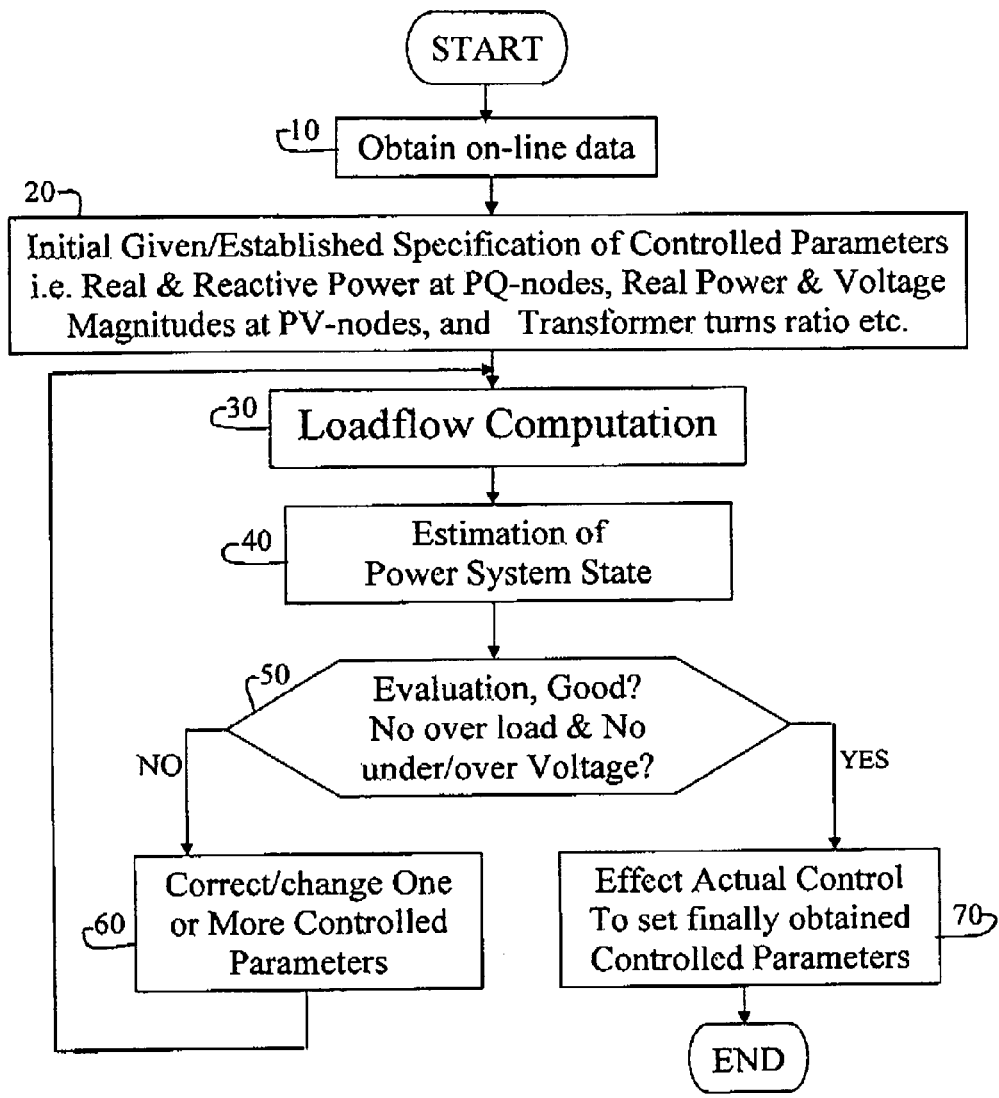
Fig.7: Prior Art

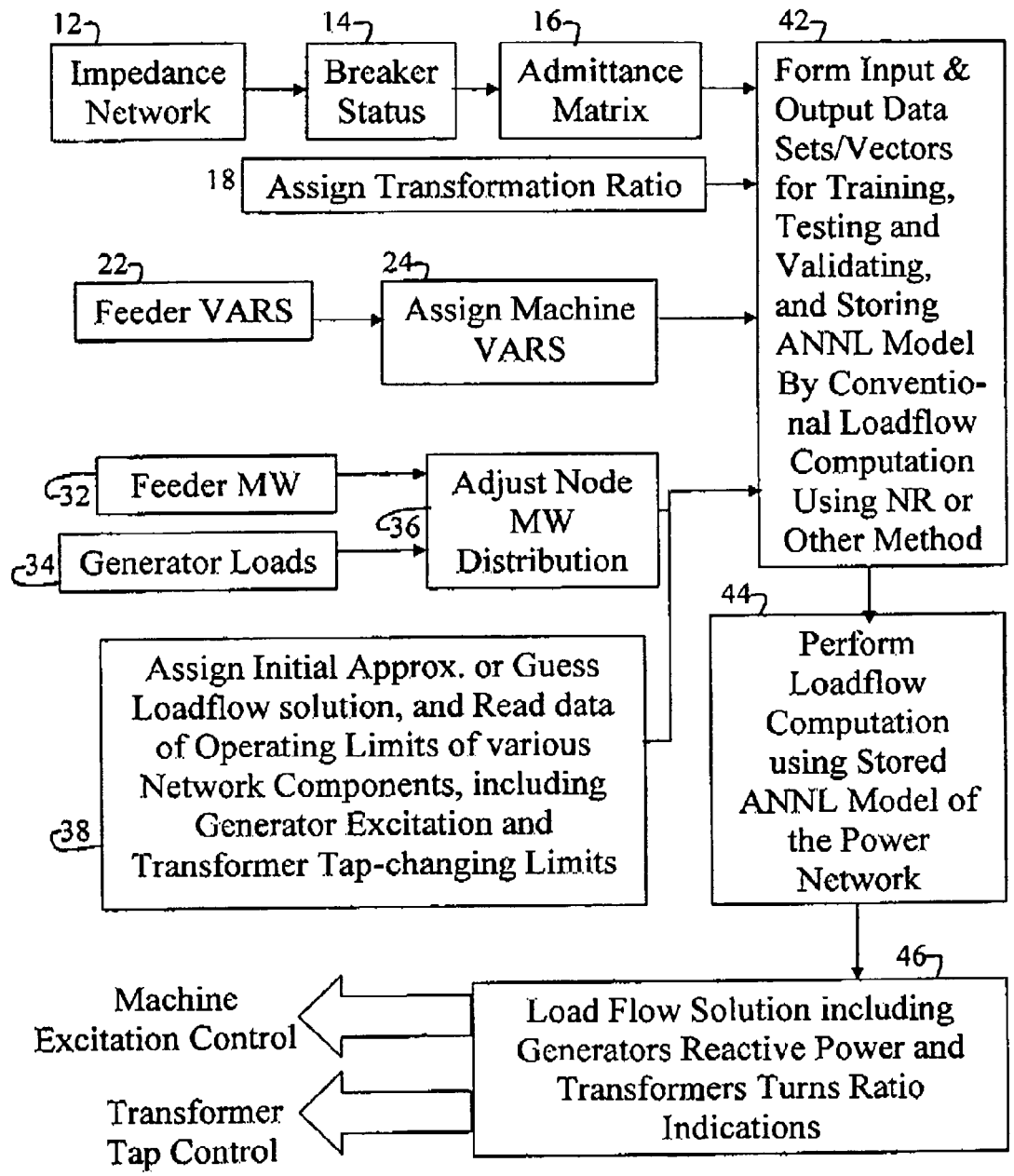
Fig. 8: Prior Art

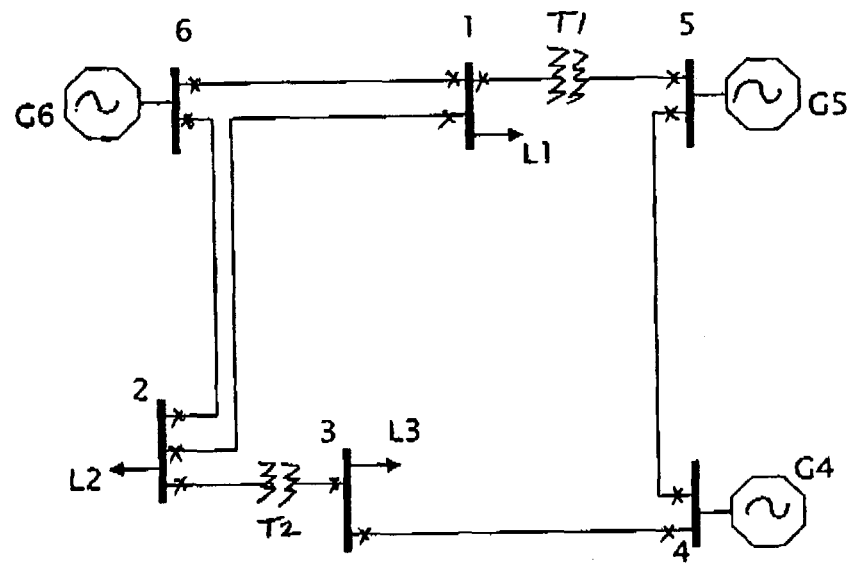
Fig. 9: Prior Art

METHOD OF ARTIFICIAL NUERAL NETWORK LOADFLOW COMPUTATION FOR ELECTRICAL POWER SYSTEM

TECHNICAL FIELD

The present invention relates to method of Artificial Neural Network Loadflow (ANNL) computation in power flow control and voltage control in an electrical power system.

BACKGROUND OF THE INVENTION

The present invention relates to power-flow/voltage control in utility/industrial power networks of the types including many power plants/generators interconnected through transmission/distribution lines to other loads and motors. Each of these components of the power network is protected against unhealthy or alternatively faulty, over/under voltage, and/or over loaded damaging operating conditions. Such a protection is automatic and operates without the consent of power network operator, and takes an unhealthy component out of service by disconnecting it from the network. The time domain of operation of the protection is of the order of milliseconds.

The purpose of a utility/industrial power network is to meet the electricity demands of its various consumers 24-hours a day, 7-days a week while maintaining the quality of electricity supply. The quality of electricity supply means the consumer demands be met at specified voltage and frequency levels without over loaded, under/over voltage operation of any of the power network components. The operation of a power network is different at different times due to changing consumer demands and development or any faulty/contingency situation. In other words healthy operating power network is constantly subjected to small and large disturbances. These disturbances could be consumer/operator initiated, or initiated by overload and under/over voltage alleviating functions collectively referred to as security control functions and various optimization functions such as economic operation and minimization of losses, or caused by a fault/contingency incident.

For example, a power network is operating healthy and meeting quality electricity needs of its consumers. A fault occurs on a line or a transformer or a generator which faulty component gets isolated from the rest of the healthy network by virtue of the automatic operation of its protection. Such a disturbance would cause a change in the pattern of power flows in the network, which can cause over loading of one or more of the other components and/or over/under voltage at one or more nodes in the rest of the network. This in turn can isolate one or more other components out of service by virtue of the operation of associated protection, which disturbance can trigger chain reaction disintegrating the power network.

Therefore, the most basic and integral part of all other functions including optimizations in power network operation and control is security control. Security control means controlling power flows so that no component of the network in over loaded and controlling voltages such that there is no over voltage or under voltage at any of the nodes in the network following a disturbance small or large. As is well known, controlling electric power flows include both controlling real power flows which is given in MWs, and controlling reactive power flows which is given in MVARS. Security control functions or alternatively overloads alleviation and over/under voltage alleviation functions can be realized through one or combination of more controls in the network. These involve control of power flow over tie line connecting other utility network, turbine steam/water/gas input control to control real power generated by each generator, load shedding function curtails load demands of consumers, excitation controls reactive power generated by individual generator which essentially controls generator terminal voltage, transformer taps control connected node voltage, switching in/out in capacitor/reactor banks controls reactive power at the connected node.

Control of an electrical power system involving power-flow control and voltage control commonly is performed according to a process shown in FIG. 7, which is a method of forming/defining and solving a loadflow computation model of a power network to affect control of voltages and power flows in a power system comprising the steps of:

Step-10: obtaining on-line/simulated data of open/close status of all switches and circuit breakers in the power network, and reading data of operating limits of components of the power network including maximum Voltage X Ampere (VA or MVA) limits of transmission lines and transformers; and PV-node, a generator-node where Real-Power-P and Voltage-Magnitude-V are given/assigned/specified/set, maximum and minimum reactive power generation capability limits of generators, and transformers tap position limits, or stated alternatively in a single statement as reading operating limits of components of the power network, Step-20: obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, Step-30: performing loadflow computation to calculate, depending on loadflow computation model used, complex voltages or their real and imaginary components or voltage magnitudes or their corrections and voltage angles or their corrections at nodes of the power network providing for calculation of power flow through different components of the power network, and to calculate reactive power generation and transformer tap-position indications, Step-40: evaluating the results of Loadflow computation of step-30 for any over loaded power network components like transmission lines and transformers, and over/under voltages at different nodes in the power system, Step-50: if the system state is acceptable implying no over loaded transmission lines and transformers and no over/under voltages, the process branches to step-70, and if otherwise. then to step-60, Step-60: correcting one or more controlled variables/parameters set in step-20 or at later set by the previous process cycle step-60 and returns to step-30, Step-70: affecting a change in power flow through components of the power network and voltage magnitudes and angles at the nodes of the power network by actually implementing the finally obtained values of controlled variables/parameters after evaluating step finds a good power system or stated alternatively as the power network without any overloaded components and under/over voltages, which finally obtained controlled variables/parameter however are stored for acting upon fast in case a simulated event actually occurs or stated alternatively as actually implementing the corrected controlled variables/parameters to obtain secure/correct/acceptable operation of power system.

Overload and under/over voltage alleviation functions produce changes in controlled variables/parameters in step-60 of FIG. 7. In other words controlled variables/parameters are assigned or changed to the new values in step-60. This correction in controlled variables/parameters could be even optimized in case of simulation of all possible imaginable disturbances including outage of a line and loss of generation for corrective action stored and made readily available for acting upon in case the simulated disturbance actually occurs in the power network. In fact simulation of all possible imaginable disturbances is the modern practice because corrective actions need be taken before the operation of individual protection of the power network components.

It is obvious that loadflow computation consequently is performed many times in real-time operation and control environment and, therefore, efficient and high-speed loadflow computation is necessary to provide corrective control in the changing power system conditions including an outage or failure of any of the power network components. Moreover, the loadflow computation must be highly reliable to yield converged solution under a wide range of system operating conditions and network parameters. Failure to yield converged loadflow solution creates blind spot as to what exactly could be happening in the network leading to potentially damaging operational and control decisions/actions in capital-intensive power utilities.

The power system control process shown in FIG. 7 is very general and elaborate. IL includes control of power-flows through network components and voltage control at network nodes. However, the control of voltage magnitude at connected nodes within reactive power generation capabilities of electrical machines including generators, synchronous motors, and capacitor/inductor banks, and within operating ranges of transformer taps is normally integral part of loadflow computation as described in "LTC Transformers and MVAR violations in the Fast Decoupled Load Flow, IEEE Trans., PAS-101, No. 9, PP. 3328-3332, September 1982." If under/over voltage still exists in the results of loadflow computation, other control actions, manual or automatic, may be taken in step-60 in the above and in FIG. 7. For example, under voltage can be alleviated by shedding some of the load connected.

The prior art and present invention are described using the following symbols and terms:

$Y_{pq}=G_{pq}+jB_{pq}$: (p-q)th element or nodal admittance matrix without shunts $Y_{pp}=G_{pp}+jB_{pp}$: p-th diagonal element of nodal admittance matrix without shunts $y_p=g_p+jb_p$: total shunt admittance at any node-p $V_p=e_p+jf_p=V_p\angle\theta_p$: complex voltage of any node-p $P_p+jQ_p$: net nodal injected power $RP_p+jRQ_p$: modified net nodal power injection specified $\phi_p$: rotation or transformation angle

[RP]: vector of modified real power injections at power-network nodes

[RQ]: vector of modified reactive power injections at power-network nodes m: number of PQ-nodes k: number of PV-nodes n=m+k+1: total number of nodes q>p: q is the node adjacent to node-p excluding the case of q=p

[ ]: indicates enclosed variable symbol to be a vector or a matrix

PQ-node: load-node, where, Real-Power-P and Reactive-Power-Q are specified

PV-node: generator-node, where, Real-Power-P and Voltage-Magnitude-V are specified Loadflow Computation: Each node in a power network is associated with four electrical quantities, which are voltage magnitude, voltage angle, real power, and reactive power. The loadflow computation involves calculation/determination of two unknown electrical quantities for other two given/specified/scheduled/set/unknown electrical quantities for each node. In other words the loadflow computation involves determination of unknown quantities in dependence on the given/specified/scheduled/set/known electrical quantities.

Loadflow Model: a set of equations describing the physical power network and its operation for the purpose of loadflow computation. The term 'loadflow model' can be alternatively referred to as 'model of the power network for loadflow computation'. The process of writing Mathematical equations that describe physical power network and its operation is called Mathematical Modeling. If the equations do not describe/represent the power network and its operation accurately the model is inaccurate, and the iterative loadflow computation method could be slow and unreliable in yielding converged loadflow computation. There could be variety of Loadflow Models depending on organization of set of equations describing the physical power network and its operation, including Newton Raphson Loadflow (NRL) Model, and Supert Super Decoupled Loadflow (SSDL) Model.

Loadflow Method: sequence of steps used to solve a set of equations describing the physical power network and its operation for the purpose of loadflow computation is called Loadflow Method, which term can alternatively be referred to as 'loadflow computation method' or 'method of loadflow computation'. One word for a set of equations describing the physical power network and its operation is: Model. In other words, sequence of step used to solve a Loadflow Model is a Loadflow Method. The loadflow method involves definition/formation of a loadflow model and its solution. There could be variety of Loadflow Methods depending on a loadflow model and iterative scheme used to solve the model including Newton Raphson Loadflow (NRL) Methods, Supert Super Decoupled Loadflow (SSDL) Method.

Artificial Neural Network

Neural Network (NN) based prior art loadflow methods of the kind carried out as step-30 in FIG. 7 are described in "Stochastic Load Flow Analysis Using Artificial Neural Networks, 2006 IEEE" by A. Jain. S. C. Tripathy. R. Balasubramanian, and Y. Kawazoe; "Radial basis function neural network for power system load-flow, Electrical Power and Energy Systems 30 (2008) 60-66" by A. Karami and M. S. Mohammadi, and "Artificial neural networks for load flow and external equivalents studies, Electric Power Systems Research (2010) article in press" by H. H. Muller, M. J. Rider and C. A. Castro. In the above publications and others, various type of Artificial Neural Networks (ANNs) involved in loadflow computation are Multilayer Perceptron (MLP). Radial Basis Function (RBF), Counter Propagation (CP) and Hopefield model. Detailed description of various ANNs and their training and testing and validation process is available in "Principles of Neurocomputing for Science and Engineering, McGraw-Hill (2001)" by Fredric M. Ham and Ivica Kostanic, and Principles of Artificial Neural Networks, World Scientific Publication (2007)" by Daniel Graupe. Testing and validation of a trained ANN is to check if the trained ANN has learned to give accurate enough output data set/vector for a given input data set/vector, which was not used in the training process. It is intended to keep basic description of Artificial Neural Network and its training process short except inventive parts.

ANN is considered as an important technique of artificial intelligence. In recent years, ANNs have gained wide spread attention and they are being used successfully in many areas of power systems. Since the first research paper "Artificial neural-net based dynamic security assessment for electric power systems, IEEE Trans. Power System 4 (1) (1989) 220-226" by D. J. Sobajic and Y. H. Pao published, increasing literature demonstrates the potential of ANN especially in applications that take advantage of the speed of ANNs for on-line calculations and their inherent capacity to overcome modeling complexity. ANN can model any nonlinear function of a device or a system described/expressed by a nonlinear equation or simultaneous nonlinear equations without knowledge of the actual model structure. ANNs can learn complex non-linear relationships among variables/parameters of nonlinear equations through a set of input/output examples, and can approximate nonlinear functional relationship among power system or in general any device or system variables/parameters of interest. An invention of artificial (not actual operational data statistics stored over long period of time like long term, short term, and daily load curves) generation of input and output data sets/vectors by different multiplication factors applied to operational variables/parameters of a power system described by simultaneous nonlinear loadflow equations comprising simulation of feasible and continuous nonlinear operating region of the power system for the purpose of training, testing and validating, forming/defining, and storing ANN computation model and then solving said stored ANN computation model using general purpose computing apparatus can also be extended in general to any device or system. It can be said that outputs of a conventional loadflow method like NRL or SSDL are functions of the operating conditions of a power system, and ANNs can be employed to approximate these functions. An attractive feature of the ANN loadflow computation is that there is no possibility of non-convergence as it might occur with iterative methods like NRL and SSDL described in "Super Super Decoupled Loadflow, Presented at IEEE International Conference—Science and Technology for Humanity (TIC-STH 2009), pp. 252-259" by Suresh B. Patel. Once an ANN is trained, it gives output in negligible time by simple direct arithmetic operations on a given set of inputs of power system operating condition. The ANN Loadflow can replace the conventional NRL and SSDL methods in real time power system operation where time constraints are very restrictive.

Artificial Neural Networks (ANNs) can be considered as Information processing systems composed of varying number of simple elements called Neurons distributed into layers. Neurons are organized in an input layer, one or more hidden layers, and an output layer. The connections between elements largely determine network function just as in natural biological nervous systems from which ANNs are inspired. ANN is an intelligent technique that mimics the functioning of a human brain, and emulates human intuition of making decisions and drawing conclusions even when presented with complex, noisy, irrelevant and partial information. The structure of an ANN with only one hidden layer is depicted in FIG. 1, which is generic and abstract with learning memorizing and adapting characteristic. The neurons in FIG. 1 are connected to each other by weighted links over which signals can pass. Each neuron receives multiple inputs from other neurons, except the neurons in the input layer, in proportion to their connection weights and then generates a single output in accordance with an activation function. An activation function can be linear or nonlinear depending on application. Sigmoid or Hyperbolic Tangent activation function is generally used for better performance of ANNs in power system applications. The weights of weighted links from a neuron from input to hidden layer is defined as $W_{ih}$, and the weights of weighted links from a neuron from hidden to output layer is defined as $W_{ho}$. The total number or neurons in input, hidden and output layers are $I_k$, $h_k$ and $o_k$, respectively, where subscript k takes values of 1 to p, q, and r respectively meaning each layer has different number of neurons as shown in FIG. 1. The number of neurons in input layer is the same as number of input variables/parameters, the number of neurons in output layer is the same as number of outputs variables/parameters, and the number of neurons in hidden layer is determined experimentally.

An ANN can be trained to perform a particular function by adjusting values of the interconnections called weights, and neuron thresholds. The process of adjusting interconnection weights and neuron thresholds to achieve output of the ANN the same as the target value or desired output for a given input as depicted in FIG. 2 is called training of ANN. Training or an ANN consists of adjusting interconnection weights of neurons using a learning algorithm. Back propagation with momentum is the commonly used learning algorithm. Multilayer Feed Forward ANNs with Error Back Propagation learning algorithm are commonly used in power system applications. Feed Forward calculations, and propagating error from output layer to input layer and weight updating in hidden and output layers are major steps of training algorithm. ANNs are also sometimes referred to as Neural Networks (NNs). Anybody skilled in the art of the process of training, testing and validating, forming/defining, storing, and then solving prior art or invention based ANN model of a device or a system or the power system knows that the process is carried out using general purpose single/multi processor computing apparatus. A General purpose computing apparatus is a computer that can be used for developing/creating, testing, and running, different types of programs like word, excel, power point, different browser programs like Internet Explorer and Chrome for surfing on Internet (World Wide Web), and even different types of Loadflow Computation Programs, and many other types of programs.

The prior art ANN training process can be divided into four modules. The training, and testing and validating process is carried out off-line, and it is the supervised process.

1. Definition of Input and Output Data Sets/Vectors:

The prior art ANN Loadflow method of "Artificial neural networks for load flow and external equivalents studies, Electric Power Systems Research (2010) article in press" by H. H. Muller, M. J. Rider and C. A. Castro, suggest the input data vector of dimension 2(m+k+1) given below.

$$G_d = V_g^2 G_d^{NORM} - P_L^{NOM} + Pg_{pv}^{NORM} + CV_p \quad (1)$$

$$B_d = -V_g^2 B_d^{NORM} - Q_L^{NORM} + CV_q \quad (2)$$

Where, $G_d^{NORM}$ and $B_d^{NORM}$ are the diagonal elements of conductance and susceptance matrices, normalized with respect to the respective largest element in base case. Load powers $P_L^{NORM}$ and $Q_L^{NORM}$, as well as generation power Pg are also normalized with respect to their base case values. Voltages of generator buses $V_g$ are also included. Contingency information is also added to equations (1) and (2) through $CV_p$ and $CV_q$. The authors write, "This additional information was included to compensate the loss of information associated to changes in off-diagonal terms of the admittance matrix." The definition of equations (1) and (2) is given in the same language of authors.

2. Training, and Testing and Validating Data Modeling:

The idea of simulating daily load curve is used for generating training, and testing and validating data sets/vectors. Therefore, for each training, and testing and validating demand profile, there is a base case and a set of contingencies, in order to simulate possible cases that could occur in practice. For the training data, the load range is defined as [0.75-1.25]pu. As for testing and validating data, this range is defined as [0.73-1.27]pu, taking into account that the testing and validating data should be different from those of training. These load ranges are applied simultaneously for all buses. For each input data set/vector representing power system operating condition, conventional loadflow computation by method like NRL or SSDL method is performed in off line mode to obtain corresponding output data set/vector. Contingencies that result in islanding, multiple contingencies, voltage magnitudes below 0.75 pu, and angles outside greater and beyond −80° and +80° are not considered for either the training, and testing and validating data sets/vectors.

3. Run and Error Control:

Each pair of input data set/vector of power system operating condition and corresponding output data set/vector of loadflow computation used as target or desired output is applied to ANN normally simulated on computer. The process of this step requires initialization of minimum number of neurons in hidden layer, and random synaptic weights of interconnections of neurons. Number of neurons in input layer is decided by number of elements of input data set/vector, and number of neurons in output layer is decided by number of elements of output data set/vector. With the initialization number of neurons in hidden layer, random synaptic weights of interconnections and application of input data set/vector, feed-forward action of the ANN generates or calculates its output data set/vector, which is compared against the target data set/vector as in FIG. 2. Error of this comparison is feed back by Back Propagation with momentum using steepest gradient descent technique or second order Levenberg-Marquardt algorithm to update the interconnection weights and threshold of neurons. This process is continued iteratively until error produced is acceptably small for all input/output data sets/vectors generated for training of ANN. Trained ANN is then tested and validated if it has learned to produce accurate enough output data sets/vectors for a given set of input data sets/vectors which are different than those used in training. In testing and validating phase, error in output data set/vector is not feedback to update weights of interconnection of neurons. If the error vector in testing and validating phase is not small enough further training is carried out followed again by testing and validating phase. This process of training followed by testing and validating is iterated until testing and validating phase produce errors acceptably small enough, and the best ANN is stored in terms of values of interconnection weights and number of neurons in different layers for actual use in solving problems for which it is trained. However, for a given set of inputs data sets/vectors the rate of convergence of training, and testing and validating process largely depends upon the number of hidden neurons, learning rate, momentum factor, and the initial values of synaptic weights. Clearly, the proper choice of all these parameters is very difficult and involves too many trials as well as uncertainties leading to several thousands of iterations for the convergence of training, and testing and validating process.

4. Processing Results:

Stored ANN in terms of values of interconnection weights, number of neurons in different layers and its performance is analyzed and recorded errors are shown and plotted for future reference and possible use.

Calculation Steps Prior Art ANNL Method:

The steps of ANN Loadflow computation method are shown in the flowchart of FIG. 3. Referring to the flowchart of FIG. 3, different steps are elaborated in steps marked with similar letters in the following. The words "Road system data" in Step-a correspond to step-10 and step-20 in FIG. 7, and step-16, step 18, step-24, step-36, step-38 in FIG. 8. All other steps in the following correspond to step-30 in FIG. 7, and step-42, step-44, and step-46 in FIG. 8.

a. Read system data
b. Form nodal admittance matrix
c. Foam input data vector using equation (1) and (2) for stored ANN, which is trained, tested and validated as per modules-1 to 4 in the above.
d. Map (Calculate) high quality and accuracy ANN Loadflow output data set/vector (solution) for a given input data set/vector using stored ANN.
c. If stored ANN trained, and tested and validated using conventional loadflow computation method like NRL or SSDL with control adjustments that accounts for physical limits of power network component equipments like reactive power generation limits of generators, and tap changing limits of tap changing transformers, go to step-g, or else follow the next step-f.
f. Perform conventional loadflow computation using method like NRL or SSDL with control adjustments using high quality initialization loadflow solution yielded by ANN
g. From calculated and known values of voltage magnitude and voltage angle at different power network nodes, and tap position of tap changing transformers, calculate power flows through power network components, and reactive power generation at PV-nodes.

SUMMARY OF THE INVENTION

It is a primary object of the present invention to improve solution efficiency of the prior art SSDL computation method under wide range of system operating conditions and network parameters by invented ANN Loadflow for use in power flow control and voltage control and other controls in the power system.

The above and other objects are achieved, according to the present invention, with Artificial Neural Network Loadflow (ANNL) computation method for Electrical Power System. In context of voltage control, the inventive method of ANNL computation for Electrical Power system consisting of plurality of electromechanical rotating machines, transformers and electrical loads connected in a network, each machine having a reactive power characteristic and an excitation element which is controllable for adjusting the reactive power generated or absorbed by the machine, and some of the transformers each having a tap changing element, which is controllable for adjusting turns ratio or alternatively terminal voltage of the transformer, said system comprising:

means for defining and solving loadflow model of the power network characterized by inventive ANNL model and any conventional loadflow computational model like SSDL in combination or only ANNL model for providing an indication of the quantity of reactive power to be supplied by each generator including the reference/slack node generator, and for providing an indication of turns ratio of each tap-changing transformer in dependence an the obtained-online or given/specified/set/known controlled network variables/parameters, and physical limits of operation of the network components, means for machine control connected to the said means for defining and solving loadflow model and to the excitation elements of the rotating machines for controlling the operation of the excitation elements of machines to produce or absorb the amount of reactive power indicated by said means for defining and solving loadflow model in dependence on the set of obtained-online or given/specified/set controlled network variables/parameters, and physical limits of excitation elements, means for transformer tap position control connected to said means four defining and solving loadflow model and to the tap changing elements of the controllable transformers for controlling the operation of the tap changing elements to adjust the turns ratios of transformers indicated by the said means for defining and solving loadflow model in dependence on the set of obtained-online or given/specified/set controlled network variables/parameters, and operating limits of the tap-changing elements.

The method and system of voltage control according to the preferred embodiment of the present invention provide voltage control for the nodes connected to PV-node generators and tap changing transformers for a network in which real power assignments have already been fixed. The said voltage control is realized by controlling reactive power generation and transformer tap positions.

The inventive system of ANNL computation can be used to solve a model of the Electrical Power System for voltage control. For this purpose real and reactive power assignments or settings at PQ-nodes, real power and voltage magnitude assignments or settings at PV-nodes and transformer turns ratios, open/close status of all circuit breaker, the reactive capability characteristic or curve for each machine, maximum and minimum tap positions limits of tap changing transformers, operating limits of all other network components, and the impedance or admittance of all lines are supplied. ANNL model gives output very fast by performing simple arithmetic operations on inputs corresponding to power system operating condition. The output of ANNL is supplied as high quality initial solution estimate to the conventional loadflow computation model like SSDL model for completing solution with control adjustments incorporated quickly in two to three iterations. During this solution the quantities, which can vary are the real and reactive power at the reference/slack node, the reactive power set points for each PV-node generator, the transformer transformation ratios, and voltages on all PQ-nodes nodes, all being held within the specified ranges. When the iterative process converges to a solution, indications of reactive power generation at PV-nodes and transformer turns-ratios or tap-settings are provided. Based on the known reactive power capability characteristics of each PV-node generator, the determined reactive power values are used to adjust the excitation current to each generator to establish the reactive power set points. The transformer taps are set in accordance with the tuns ratio indication provided by conventional loadflow computation like the SSDL computation.

For voltage control, system of ANNL and SSDL computation in combination or only ANNL can be employed either on-line or off-line. In off-line operation, the user can simulate and experiment with various sets of operating conditions and determine reactive power generation and transformer tap settings requirements. For on-line operation, the loadflow computation system is provided with data identifying the current real and reactive power assignments and transformer transformation ratios, the present status of all switches and circuit breakers in the network and machine characteristic curves in steps-10 and -20 in FIG. 7, and steps 14, 18, 24, 36, and 38 in FIG. 8 described below. Based on this information, a model of the system provide the values for the corresponding node voltages and angles, reactive power set points for each machine and the transformation ratio and tap changer position for each transformer.

Inventions include ANNL method involving ANN trained with inventive input data sets/vectors of variables/parameters that take different input values of invented input/output data sets/vectors for off-line training, and testing and validating or ANN.

BRIEF DESCRIPTION OF DRAWINGS

FIG. 1 is an Artificial Neural Network (ANN) configuration

FIG. 2 is a block diagram of Artificial Neural Network (ANN) Training

FIG. 3 is a flow chart of prior art Artificial Neural Network Loadflow computation FIG. 7 is a prior art flow-chart of the overall controlling method for an electrical power system involving loadflow computation as a step which can be executed using the invented ANN loadflow computation method of FIG. 4.

FIG. 8 is a prior art flow-chart of the simple special case of voltage control system in overall controlling system of FIG. 7 for an electrical power system FIG. 9 is a prior art one-line diagram of an exemplary 6-node power network having a reference/slack/swing node, two PV-nodes, and three PQ-nodes

DESCRIPTION OF A PREFERRED EMBODIMENT

Figure 4:
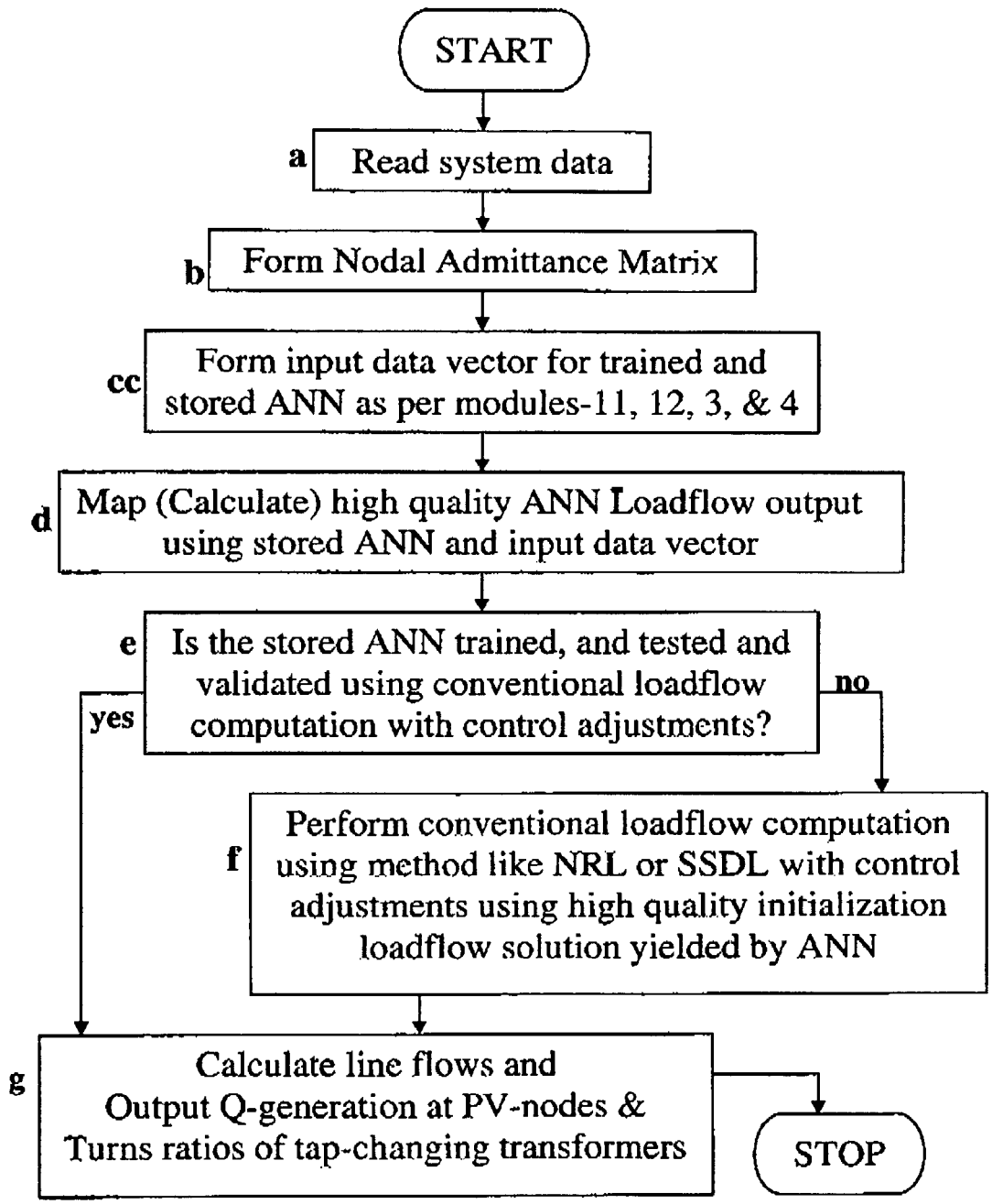
FIG. 4 is a flow chart of invented Artificial Neural Network Loadflow computation

A loadflow computation is involved as a step in power (low control and/or voltage control in accordance with FIG. 7 or FIG. 8. A preferred embodiment of the present invention is described with reference to FIG. 8 as directed to achieving voltage control.

FIG. 9 is a simplified one-line diagram of an exemplary utility power network to which the present invention may be applied. The fundamentals of one-line diagrams are described in section 6.11 of the text ELEMENTS OF POWER SYSTEM ANALYSIS, forth edition, by William D. Stevenson, Jr., McGraw-Hill Company, 1982. In FIG. 9, each thick vertical line is a network node. The nodes are interconnected in a desired manner by transmission lines and transformers each having its impedance, which appears in the loadflow models. Two transformers in FIG. 9 are equipped with tap changers to control their turns ratios in order to control terminal voltage of node-1 and node-2 where large loads are connected.

Node-6 is a reference node alternatively referred to as the slack or swing-node, representing the biggest power plant in a power network. Nodes-4 and -5 are PV-nodes where generators are connected, and nodes-1, -2, and -3 are PQ-nodes where loads are connected. It should be noted that the nodes-4, -5, and -6 each represents a power plant that contains many generators in parallel operation. The single generator symbol at each of the nodes-4, -5, and -6 is equivalent of all generators in each plant. The power network further includes controllable circuit breakers located at each end of the transmission lines and transformers, and depicted by cross markings in one-line diagram of FIG. 9. The circuit breakers can be operated or in other words opened or closed manually by the power system operator or relevant circuit breakers operate automatically consequent of unhealthy or faulty operating conditions. The operation of one or more circuit breakers modify the configuration of the network. The arrows extending certain nodes represent loads.

A goal of the present invention is to provide a reliable and computationally efficient loadflow computation that appears as a step in power flow control and/or voltage control systems of FIG. 7 and FIG. 8. However, the preferred embodiment of loadflow computation as a step in control of node voltages of PV-node generators and tap-changing transformers is illustrated in the flow diagram of FIG. 8 in which present invention resides in function steps and 44.

Short description of other possible embodiment of the present invention is also provided herein. The present invention relates to control of utility/industrial power networks of the types including plurality of power plants/generators and one or more motors/loads, and connected to other external utility. In the utility/industrial systems of this type, it is the usual practice to adjust the real and reactive power produced by each generator and each of the other sources including synchronous condensers and capacitor/inductor banks, in order to optimize the real and reactive power generation assignments of the system. Healthy or secure operation of the network can be shifted to optimized operation through corrective control produced by optimization functions without violation of security constraints. This is referred to as security constrained optimization of operation. Such an optimization is described in the U.S. Pat. No. 5,081,591 dated Jan. 13, 1992: "Optimizing Reactive Power Distribution in an Industrial Power Network", where the present invention can be embodied by replacing the step nos. 56 and 66 each by a step of constant gain matrices [Yθ] and [YV], and replacing steps of "Exercise Newton-Raphson Algorithm" by steps of "Exercise ANNL Computation" in places of steps 58 and 68. This is just to indicate the possible embodiment or the present invention in optimization functions like in many others including state estimation function. However, invention is being claimed through a simplified embodiment without optimization function as in FIG. 8 in this application. The inventive steps-42 and 44 in FIG. 8 are different than those corresponding steps-56, and -58, which constitute a well known Newton-Raphson loadflow method, and were not inventive even in U.S. Pat. No. 5,081,591.

In FIG. 8, function step 12 provides stored impedance e values of each network component in the system. This data is modified in a function step 14, which contains stored information about the open or close status of each circuit breaker. For each breaker that is open, the function step 14 assigns very high impedance to the associated line or transformer. The resulting data is than employed in a function step 16 to establish an admittance matrix for the power network. The data provided by function step 12 can be input by the computer operator from calculations based on measured values of impedance of each line and transformer, or on the basis of impedance measurements after the power network has been assembled.

Each of the transformers T1 and T2 in FIG. 9 is a tap changing transformer having a plurality of tap positions each representing a given transformation ratio. An indication of initially assigned transformation ratio for each transformer is provided by function step 18 in FIG. 8.

Indications of initial reactive power, or Q on each node, based on initial calculations or measurements, are provided by a function step 22 and these indications are used in function step 24, to assign a Q level to each generator and motor. Initially, the Q assigned to each machine can be the same as the indicated Q value for the node to which that machine is connected.

An indication or measured real power, P, on each node is supplied by function step 32. Indications of assigned/specified/scheduled/set generating plant loads that are constituted by known program are provided by function step 34, which assigns the real power, P, load for each generating plant on the basis of the total P, which must be generated within the power system. The value of P assigned to each power plant represents an economic optimum, and these values represent fixed constraints on the variations, which can be made by the system according to the present invention. The indications provided by function steps 32 and 34 are supplied to function step 36 which adjusts the P distribution on the various plant nodes accordingly. Function step 38 assigns initial approximate or guess solution to begin iterative method of loadflow computation, and reads data file of operating limits on power network components, such as maximum and minimum reactive power generation capability limits of PV-nodes generators.

The indications provided by function steps 16, 18, 24, 36, and 38 are supplied to a function step 42 in which input variables/parameters for ANNL are calculated and formed.

The indications provided by function steps 24, 36, 38 and 42 are supplied to function step 44 where inventive ANNL in combination with SSDL computation is carried out, the results of which appear in function step 46. The loadflow computation yields voltage magnitudes and voltage angles at PQ-nodes, real and reactive power generation by the reference/slack/swing node generator, voltage angles and reactive power generation indications at PV-nodes, and transformer turns ratio or tap position indications for tap changing transformers. The system stores in step 44 a representation of the reactive capability characteristic of each PV-node generator and these characteristics act as constraints on the reactive power that can be calculated for each PV-node generator for indication in step 46. The indications provided in step 46 actuate machine excitation control and transformer tap position control. All the loadflow computation methods using SSDL models can be used to effect efficient and reliable voltage control in power systems as in the process flow diagram of FIG. 8.

Inventions are an invented ANNL method that solves ANNL model formed/defined/created by ANN trained, tested and validated with inventive input data sets/vectors of variables/parameters for off-line process of training, and testing and validating of ANN. Inventions achieve unification of loadflow computations and steady state security evaluation functions like contingency analysis, and voltage and angle stability evaluations.

An inventive ANN training, and testing and validating process can also be divided into four modules. The training, and testing and validating process is carried out off-line, and it is the supervised process. The inventive training, and testing and validating process differs only in module-1, and module-2 of the four modules listed for the prior art ANN training, and testing and validating process in the above. Modules-3 and -4 are the same for both prior art and inventive ANN training, and testing and validating process. Therefore, only inventive modules-11, and -12 corresponding to prior art modules-1, and -2 are listed in the following description.

11. Definition of Input and Output Data Sets/Vectors:

Invented input data set/vector of dimension 2n for ANN loadflow computation is given below as modified scheduled/specified real, $RP_p$ and reactive, $RQ_p$ power injections at node-p.

$$RP_p = (P_{pg} - P_{pl}) - V_{po}^2(G_{pp} + g_p) \quad (3)$$

$$RQ_p = (Q_{pg} - Q_{pl}) + V_{po}^2(B_{pp} + b_p) \quad (4)$$

OR $$RP_p = (P_{pg} - P_{pl}) - (e_{po}^2 + f_{po}^2)(G_{pp} + g_p) \quad (5)$$

$$RQ_p = (Q_{pg} - Q_{pl}) + (e_{po}^2 + f_{po}^2)(B_{pp} + b_p) \quad (6)$$

OR $$RP_p = (P_{pg} - P_{pl}) + V_{po}^2(G_{pp} + g_p) \quad (7)$$

$$RQ_p = (Q_{pg} - Q_{pl}) - V_{po}^2(B_{pp} + b_p) \quad (8)$$

OR $$RP_p = (P_{pg} - P_{pl}) + (e_{po}^2 + f_{po}^2)(G_{pp} + g_p) \quad (9)$$

$$RQ_p = (Q_{pg} - Q_{pl}) - (e_{po}^2 + f_{po}^2)(B_{pp} + b_p) \quad (10)$$

Figure 5A:
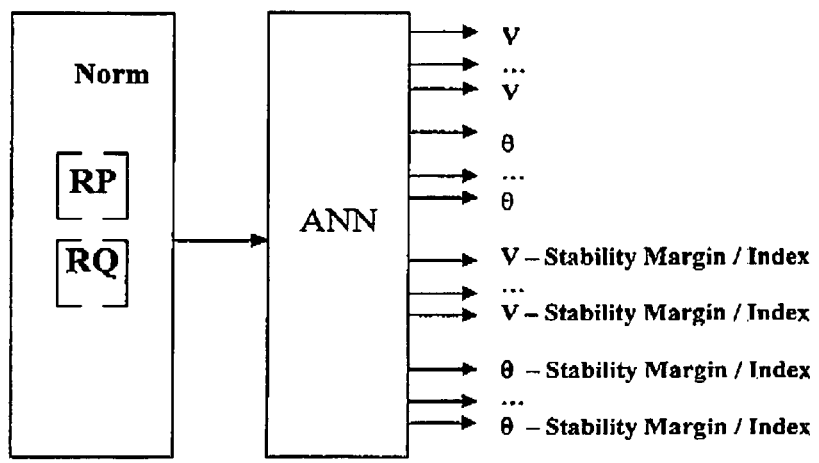
FIG. 5a, FIG. 5b, and FIG. 5c are block diagrams of various possible invented ANN configurations
Figure 5B:
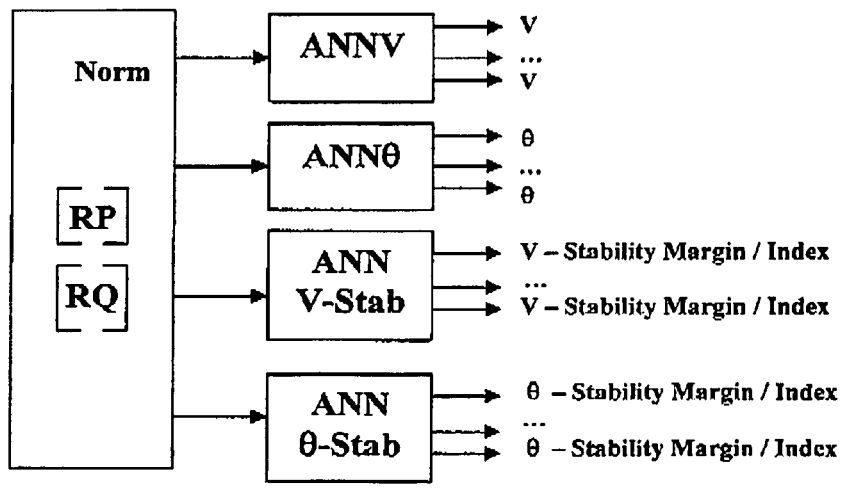

Where, p=1, 2, ..., n in the power network of the total number of n-nodes, and modified scheduled/specified real, $RP_p$ and reactive, $RQ_p$ power injections at node-p calculated by equations (3) to (10) are normalized, $P_{pg}$ and $Q_{pg}$ are scheduled/specified real and reactive power generation at node-p the values of which would be zero in case of no generation at any of the nodes, $P_{pl}$ and $Q_{pl}$ are scheduled/specified real and reactive power load/demand at node-p the values of which would be zero in case of no load/demand at any of the nodes. Flat-start is the same voltage angle (normally of zero degree) at all nodes, and scheduled/specified voltage magnitude at respective generation node and reference/slack node and voltage magnitude of 1.0 pu at all load nodes, which is conventionally used as initial starting solution guess for classical loadflow computation methods like NRL or SSDL. $V_{po}^2$ or $(e_{po}^2 + f_{po}^2)$ in equations (3) to (10) is the flat-start voltage magnitude at node-p. Algebraic signs – and + preceding $V_{po}^2$ or $(e_{po}^2 + f_{po}^2)$ in equations (3) to (6) can also alternatively take + and – signs respectively, as in equations (7) to (10). While description and figures in this application are given for polar coordinate formulation of the loadflow problem, they can easily be adapted for rectangular coordinate formulation. Components of output data set/vector consists of estimated voltage angles at PQ-nodes+PV-nodes, voltage magnitudes at PQ-nodes, reactive power generation at PV-nodes, V-stability index/margin and O-stability N index/margin at PQ-nodes. These invented input/output data sets/vectors are depicted in FIG. 5 for various ANN configurations. FIG. 5 (a) depicts single ANN for calculation of all output variables/parameters. FIG. 5 (b) depicts four different ANNs for calculation of four different class or group of output variables/parameters that are voltage magnitudes, voltage angles, voltage magnitude stability index/margin, and voltage angle stability index/margin. FIG. 5 (c) depicts different ANN for each output variable/parameter to be estimated. One separate ANN is trained, tested and validated for each output variable/parameter estimated. It should be noted that data set/vector of input variables/parameters is the same in all FIGS. 5 (a), 5(b), and 5(c). Input data set/vector of 2n components/elements is composed of the input variables/parameters $RP_p$ and $RQ_p$ each of n-components/elements in n-node power network. Each of the components/elements of the input data set/vector is normalized by the largest individual value of the component/element from among the total of 2n components/elements of actual values or base case values of the input data set/vector. Similarly, each of the components/elements of the output data set/vector is normalized by the largest individual value of the component/element from among the total number of components/elements of actual values or base case values of the output data set/vector. There are many other normalization techniques that can be used are available in literature on the subject of ANN.

12. Training, and Testing and Validating Data Modeling:

The idea of simulating feasible and continuous non-linear operating region of power system is used for generating training, and testing and validating input and output data sets/vectors for formation/definition/creation of ANNL model. Therefore, for each training, and testing and validating data set/vector of demand profile, there is a base case and a set of contingencies, in order to simulate possible cases that could occur in practice. Invented training, and testing and validating data sets/vectors are generated by simulating different loading, and network parametric including contingent conditions and running conventional loadflow computation like NRL or SSDL program off-line. The invented training, and testing and validating data sets/vectors generated are listed in the following items 1) to 21).

1) Different input data sets/vectors each of dimension 2n is generated as modified given/assigned/specified/set real, $RP_p$ and reactive, $RQ_p$ power injections at node-p given by equations (3) to (10), by changing values of $P_{pg}$, $P_{pl}$, $G_{pp}$, $g_p$, and $Q_{pg}$, $Q_{pl}$, $B_{pp}$, $b_p$ corresponding to different operating condition of the power system.

2) Input data set/vector as defined in item-1) is generated by application of a P-scale factor uniformly to a base case real power loads at PQ-nodes, and increasing the P-scale factor in pre-defined steps for creating other P-scale factors for generation of other input data sets/vectors, wherein application of the P-scale factor uniformly means the same factor applied to the base case real power loads at all of the PQ-nodes, and the base case constitute when the P-scale factor is 1.0.

3) Input data set/vector as defined in item-1) is generated by application of a Q-scale factor uniformly to a base case reactive power loads at PQ-nodes, and increasing the Q-scale factor in pre-defined steps for creating other Q-scale factors for generation of other input data sets/vectors, wherein application of the Q-scale factor uniformly means the same factor applied to the base case reactive power loads at all of the PQ-nodes, and the base case constitute when the Q-scale factor is 1.0.

4) Input data set/vector as defined in item-1) is generated by application of a P-scale factor non-uniformly to a base case real power loads at PQ-nodes, and increasing the P-scale factor in pre-defined steps for creating other P-scale factors for generation of other input data sets/vectors, wherein application of the P-scale factor non-uniformly means the factor is applied to the base case real power load at only one of the PQ-nodes at a time.

5) Input data set/vector as defined in item-1) is generated by application of a Q-scale factor non-uniformly to a base case reactive power loads at PQ-nodes, and increasing the Q-scale factor in pre-defined steps for creating other Q-scale factors for generation of other input data sets/vectors, wherein application of the Q-scale factor non-uniformly means the factor is applied to the base case reactive power load at only one of the PQ-nodes at a time.

6) Total increase in real power load due to application of a P-scale factor uniformly to all real power loads at PQ-nodes as defined in item-2) is distributed to PV-node generators in proportion to their participation factors in the base case total of real power loads at PQ-nodes.
7) Increase in real power load due to application of a P-scale factor non-uniformly to a real power load at a PQ-node as defined in item-4) is distributed to PV-node generators in proportion to their participation factors in the base case total of real power loads at PQ-nodes.
8) Total increase in real power load due to application of a P-scale factor uniformly to all real power loads at PQ-nodes as defined in item-2) is distributed to PV-node generators randomly.
9) Increase in real power load due to application of a P-scale factor non-uniformly to a real power load at a PQ-node as defined in item-4) is distributed to PV-node generators randomly.
10) Total increase in real power load due to application of a P-scale factor uniformly to all real power loads at PQ-nodes as defined in item-2) is distributed among all PQ-nodes randomly.
11) Total increase in reactive power load due to application of a Q-scale factor uniformly to all reactive power loads at PQ-nodes as defined in item-3) is distributed among all PQ-nodes randomly.
12) Input data set/vector as defined in item-1) is generated by application of a R-scale factor uniformly to a base case branch resistances, and increasing the R-scale factor in pre-defined steps for creating other R-scale factors for generation of other input data sets/vectors, wherein application of the R-scale factor uniformly means the same factor applied to the base case resistances of all of the branches in the power network, and the base case constitute when the R-scale factor is 1.0.
13) Input data set/vector as defined in item-1) is generated by application of a X-scale factor uniformly to a base case branch reactances, and increasing the X-scale factor in pre-defined steps for creating other X-scale factors for generation of other input data sets/vectors, wherein application of the X-scale factor uniformly means the same factor applied to the base case reactances of all of the branches in the power network, and the base case constitute when the X-scale factor is 1.0.
14) Input data set/vector as defined in item-1) is generated by application of a R-scale factor non-uniformly to a base case branch resistance, and increasing the R-scale factor in pre-defined steps for creating other R-scale factors for generation of other input data sets/vectors, wherein application of the R-scale factor non-uniformly means the factor is applied to the base case branch resistance of only one branch at a time.
15) Input data set/vector as defined in item-1) is generated by application of a X-scale factor non-uniformly to a base case branch reactance, and increasing the X-scale factor in pre-defined steps for creating other X-scale factors for generation of other input data sets/vectors, wherein application of the X-scale factor non-uniformly means the factor is applied to the base case branch reactance of only one branch at a time.
16) Input data sets/vectors as defined in item-1) is generated for simulation of branch outage contingencies by removing branch impedance contribution to diagonal elements of the conductance or susceptance matrix that appear in equations (3) to (10).
17) For each input data set/vector as defined in item-1), an output data set/vector is calculated by performing loadflow computation off-line by a classical known loadflow computation method like NRL or SSDL, and output data set/vector of dimension 2(n−1)+2m constitutes calculated values of voltage angles at PQ-nodes+PV-nodes, voltage magnitudes at PQ-nodes, reactive power generation at PV-nodes, V-stability index/margin and θ-stability index/margin at PQ-nodes, wherein n is the total number of nodes and m is the number of PQ-nodes in the power system.
18) Output data set/vector of voltage angle θ-stability margin/index of dimension m is determined by noting real power loads at all PQ-nodes for a given input data set/vector as defined in item-1), increasing real power only at one given PQ-node until Conventional Loadflow Computation Method Like-SSDL (CLCML-SSDL) diverges, noting increased real power just before divergence of CLCML-SSDL, taking difference of real power load just before divergence of CLCML-SSDL and real power load of the corresponding node in the given input data set/vector that gives voltage angle θ-stability margin/index for the given PQ-node, and repeating the process for each of the m PQ-nodes for a given input data set/vector.
19) Output data set/vector of voltage magnitude V-stability margin/index of dimension m is determined by noting reactive power loads at all PQ-nodes for a given input data set/vector as defined in item-1), increasing reactive power only at one given PQ-node until Conventional Loadflow Computation Method Like-SSDL (CLCML-SSDL) diverges, noting increased reactive power just before divergence of CLCML-SSDL, taking difference of reactive power load just before divergence of CLCML-SSDL and reactive power load of the corresponding node in the given input data set/vector that gives voltage magnitude V-stability margin/index for the given PQ-node, and repeating the process for each of the m PQ-nodes for a given input data set/vector.
20) The solution of the ANN loadflow computation model uses an entropy reduction technique as discussed in detail in paragraph [047] of Suresh's diakoptics in that it determines a sub-network for each node involving directly connected nodes referred to as level-1 nodes and their directly connected nodes referred to as level-2 nodes wherein the level of outward connectivity for a local sub-network around a given node whose single variable is to be estimated using separate ANN is to be determined experimentally for deciding the number of inputs for the separate ANN that estimates the single variable of the given node.
21) Generating input and output data sets/vectors that simulate feasible and continuous nonlinear operating region of the power system for training, testing and validating, forming/defining, and storing the ANNL computation model, is a very specific of alternate more general statement as generating input and output data sets/vectors that simulate feasible and continuous nonlinear operating region of a system or a device for training, testing and validating, forming/defining, and storing an ANN computation model for solution of simultaneous nonlinear equations, wherein the system or device is physical or chemical or biological or atmospheric or social or economical or political.

The extensive datasets generated as in items 1) to 21) in the above are randomized while applying to ANN for training, and testing and validating purposes, 75% of which is used for training and the remaining 25% is used for testing and validation.

The scale factors are increased (Say, in steps 0.0, 0.5, 1.0, 1.5, 2.0, . . . ) until loadflow solution by conventional methods such as NRL or SSDL methods diverge. The scale factor 0.0 applied uniformly to the base case load means it is the no load operation of the power system or any other system or device. Divergence of loadflow methods are due to numerical or node voltage or node angle instabilities. Voltage magnitude and phase angle values in the solution before divergence are respective stability limits, and voltage magnitude and phase angle values in loadflow solution provide direct measure to the respective stability margins. Voltage magnitude stability margin can be calculated by subtracting voltage stability limit value from voltage magnitude obtained by loadflow computation for a given power system operating condition represented by input data set/vector. Similarly, voltage angle stability margin can be calculated. For each input data set/vector representing power system operating condition, loadflow computation by NRL or SSDL method is performed in off line mode to obtain corresponding output data set/vector. Contingencies that result in islanding, and multiple contingencies, are not considered for either the training and testing and validating data sets/vectors.

The steps of an invented ANN Loadflow computation method are shown in the flowchart of FIG. 4. Referring to the flowchart of FIG. 4, different steps are elaborated in steps marked with similar letters in the following. The words "Read system data" in Step-a correspond to step-10 and step-20 in FIG. 7, and step-16, step-18, step-24, step-36, step-38 in FIG. 8. All other steps in the following correspond to step-30 in FIG. 7, and step-42, step-44, and step-46 in FIG. 8. It should be noted that only double lettered step-cc of the invented ANN loadflow method differs from those of prior art method.

a. Read system data
b. Form nodal admittance matrix
cc. Form input data set/vector using equation (3) to (10) for stored ANN, which is trained, and tested and validated as per module-11, module-12, module-3, and module-4 in the above.
d. Map (Calculate) high quality and accuracy ANN Loadflow output using data/set (solution) for a given input data set/vector using stored ANN.
e. If stored ANN trained, and tested and validated using conventional loadflow computation method like NRL or SSDL with control adjustments that accounts for physical limits of power network component equipments like reactive generation limits of generators, and tap changing limits of tap changing transformers, go to step-g, or else follow the next step-f.
f. Perform conventional loadflow computation using method like NRL or SSDL with control adjustments using high quality initialization loadflow solution yielded by ANN
g. From calculated and known values of voltage magnitude and voltage angle at different power network nodes, and tap position of tap changing transformers, calculate power flows through power network components, and reactive power generation at PV-nodes.

Feature Selection Technique

Figure 5C:
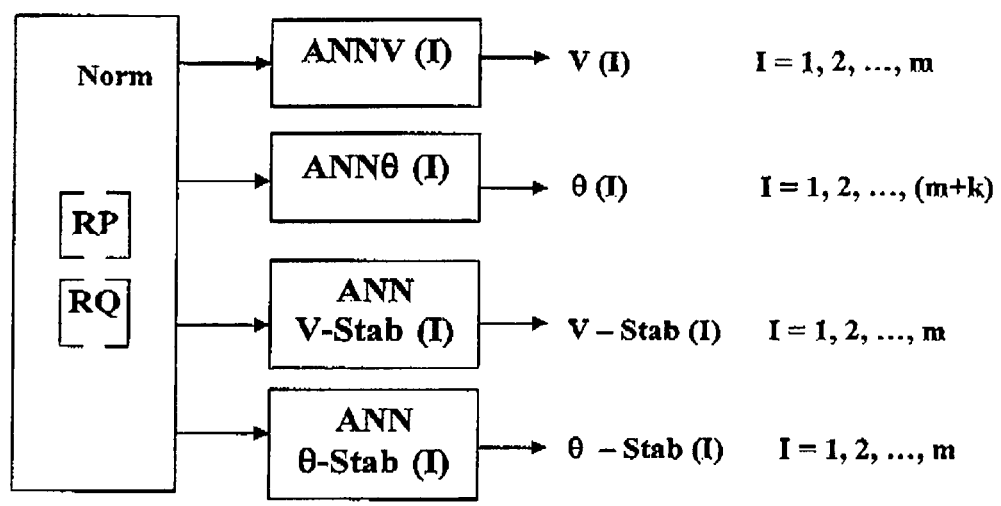

When an ANN is constructed and designed for single output variable/parameter calculation as in FIG. 5c, the total number of ANNs required for the unified functions of loadflow computation and contingency evaluations are 2(n−1) as there are two variables/parameters are to be calculated for each power network node. Similarly for steady state voltage and angle stability calculations combined, total number of ANNs required are 2m. The input vector for all these [2(n−2)+2m)] ANNs is the same of dimension 2n, which is prohibitively large for power networks of the order of 1000s of nodes. This is because the number of connection weights that must be determined in the training process increase with increasing number of input nodes. It will take a long time to train the ANN if there are a great number of inputs. In the worst case, the training process may fail to converge or may converge to local minimum that results in poor performance in the testing and validating phase. Therefore it is essential to reduce the number of inputs to the ANN and retain only those system variables that have significant effects on the desired or target output. Feature selection is especially important when we manage to apply ANN to a power system containing a great number of elements and variables. To train and finally store an ANN capable of yielding accurate estimates of voltage magnitudes, angles, V-stability index/margin, and θ-stability index/margin, it is essential to identify the key system features that affect these stated variables the most and employ the identified features as the inputs to the ANN. An approach based on system entropy is normally used as described in the available literature and in some of the reference cited in the above in this document. However, an invented approach is to use the technique of Suresh's diakoptics claimed in U.S. Pat. No. 7,788,051 dated Aug. 31, 2010. "Method and Apparatus for Parallel Loadflow Computation for Electric Power System". The Suresh's diakoptics technique determines a sub-network for each node involving directly connected nodes referred to as level-1 nodes and their directly connected nodes referred to as level-2 nodes and so on, wherein the level of outward connectivity for a local sub-network around a given node whose single variable is to be estimated using separate ANN is to be determined experimentally. For example, an estimation of a node variable by a separate ANN for each variable in 1000 node power system requires 2000 inputs. Whereas an invented approach stated in the above can reduce required inputs to about 200 by determining sub-network of may be say 5 to 20 levels of outward connectivity around a node whose single variable is to be estimated using the separate ANN.

Figure 6:
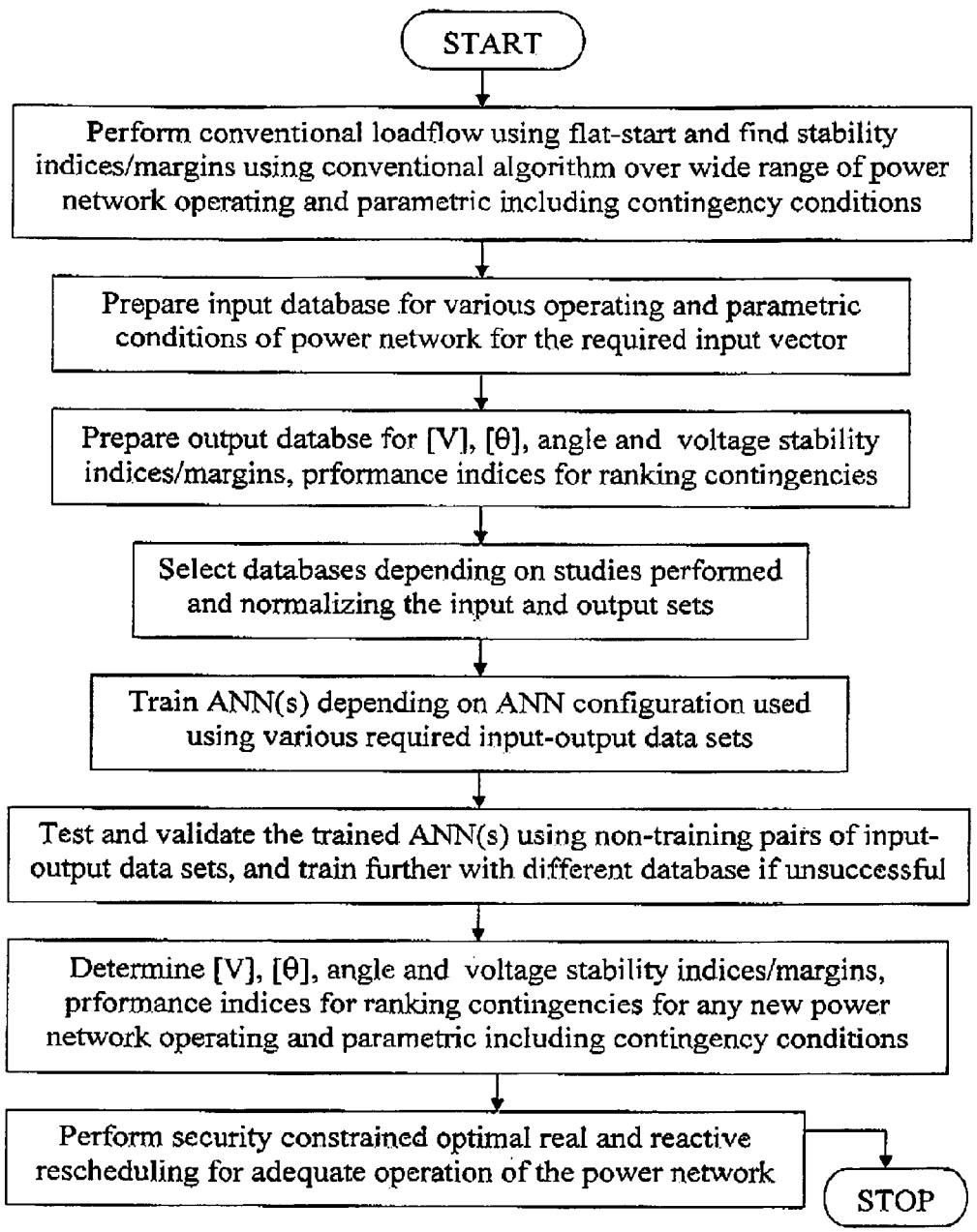
FIG. 6 is a flow-chart of invented ANN Loadflow based security evaluation functions

FIG. 6 is the overall integrated flow-chart of invented ANN Loadflow based security evaluation functions. Its separate steps are not elaborated and listed her because they are self-explanatory based on above description and publicly available literature. Moreover, they do not form part of claims.

General Statements

The system stores a representation of the reactive capability characteristic of each machine and these characteristics act as constraints on the reactive power, which can be calculated for each machine.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respect as illustrative and not restrictive, the scope of the invention being indicated by the appended claims in addition to the foregoing description, and all changes which come within the meaning and range of equivalency of the claims are therefore intended to be embraced therein.

The embodiments of the invention in which an exclusive property or privilege is claimed are defined as follows:

1. A method of forming and solving an Artificial Neural Network Loadflow (ANNL) computation model of a power network to affect control of voltages and power flows in a power system, comprising the steps of:

obtaining on-line or simulated data of open or close status of all switches and circuit breakers in the power network, and reading data of operating limits of components of the power network including maximum Voltage×Ampere (VA or MVA) carrying capability limits of transmission lines, transformers, and PV-node, a generator-node where Real-Power-P and Voltage-Magnitude-V are specified, maximum and minimum reactive power generation capability limits of generators, and transformers tap position limits, obtaining on-line readings of specified Real-Power-P and Reactive-Power-Q at PQ-nodes, Real-Power-P and voltage-magnitude-V at PV-nodes, voltage magnitude and angle at a slack node, and transformer turns ratios, wherein said on-line readings are the controlled variables, generating input and output data sets comprising simulation of feasible and continuous nonlinear operating region of the power system, and using said input and output data sets in obtaining trained, tested and validated, formed, and stored ANNL computation model by using general purpose computing apparatus, wherein different input data sets each of dimension 2n is generated as modified specified real, $RP_p$ and reactive, $RQ_p$ power injections at node-p given by equations (3) to (10), by changing values of operational parameters $P_{pg}$, $P_{pl}$, $G_{pp}$, $g_p$, and $Q_{pg}$, $Q_{pl}$, $B_{pp}$, $b_p$ corresponding to different operating condition of the power system, $$RP_p = (P_{pg} - P_{pl}) - V_{po}^2 (G_{pp} + g_p) \qquad (3)$$

$$RQ_p = (Q_{pg} - Q_{pl}) + V_{po}^2 (B_{pp} + b_p) \qquad (4)$$

OR $$RP_p = (P_{pg} - P_{pl}) - (e_{po}^2 + f_{po}^2)(G_{pp} + g_p) \qquad (5)$$

$$RQ_p = (Q_{pg} - Q_{pl}) + (e_{po}^2 + f_{po}^2)(B_{pp} + b_p) \qquad (6)$$

OR $$RP_p = (P_{pg} - P_{pl}) + V_{po}^2 (G_{pp} + g_p) \qquad (7)$$

$$RQ_p = (Q_{pg} - Q_{pl}) - V_{po}^2 (B_{pp} + b_p) \qquad (8)$$

OR $$RP_p = (P_{pg} - P_{pl}) + (e_{po}^2 + f_{po}^2)(G_{pp} + g_p) \qquad (9)$$

$$RQ_p = (Q_{pg} - Q_{pl}) - (e_{po}^2 + f_{po}^2)(B_{pp} + b_p) \qquad (10)$$

Where, $p = 1, 2, \ldots, n$ in the power network of the total number of n-nodes, and modified specified real, $RP_p$ and reactive, $RQ_p$ power injections at node-p calculated by equations (3) to (10) are normalized, $G_{pp}$ and $B_{pp}$ are real and imaginary components of diagonal elements of admittance matrix without shunts, $g_p$ and $b_p$ are real and imaginary components of total shunt admittance at any node-p, $P_{pg}$ and $Q_{pg}$ are specified real and reactive power generation at node-p the values of which would be zero in case of no generation at any of the nodes, $P_{pl}$ and $Q_{pl}$ are specified real and reactive power load at node-p the values of which would be zero in case of no load at any of the nodes, flat-start being the same voltage angle of zero degree at all nodes, and specified voltage magnitude at respective generation node and slack node and voltage magnitude of 1.0 pu at all load nodes, which is conventionally used as initial starting solution guess for classical Newton-Raphson Loadflow (NRL) and Super Super Decoupled Loadflow (SSDL) computation methods, and $V_{po}$, and $e_{po}$, $f_{po}$ are the flat-start voltage magnitude and its real and imaginary components respectively at node-p, performing loadflow computation by solving said trained, tested and validated, formed, and stored ANNL computation model to calculate, complex voltages or their real and imaginary components or voltage magnitude and voltage angle at nodes of the power network providing for calculation of power flow through different components of the power network, and to calculate reactive power generations at PV-nodes and slack node, real power generation at the slack node and transformer tap-position indications, evaluating loadflow computation for any over loaded components of the power network and for under or over voltage at any of the nodes of the power network, correcting one or more controlled variables and repeating the performing loadflow computation, evaluating, and correcting steps until evaluating step finds no over loaded components and no under or over voltages in the power network, and affecting a change in power flow through components of the power network and voltage magnitudes and angles at the nodes of the power network by actually implementing the finally obtained values of controlled variables after evaluating step finds a good power system or stated alternatively the power network without any overloaded components and under or over voltages, which finally obtained controlled variables however are stored for acting upon fast in case a simulated event actually occurs.

2. The method as defined in claim 1, wherein input data set is generated by application of a P-scale factor uniformly to a base case real power loads at PQ-nodes, and increasing the P-scale factor in pre-defined steps for creating other P-scale factors for generation of other input data sets, wherein application of the P-scale factor uniformly means the same factor applied to the base case real power loads at all of the PQ-nodes, and the base case constitute when the P-scale factor is 1.0.

3. The method as defined in claim 2, wherein total increase in real power load due to application of a P-scale factor uniformly to all real power loads at PQ-nodes is distributed to PV-node generators in proportion to their participation factors in the base case total of real power loads at PQ-nodes.

4. The method as defined in claim 2, wherein total increase in real power load due to application of a P-scale factor uniformly to all real power loads at PQ-nodes is distributed to PV-node generators randomly.

5. The method as defined in claim 2, wherein total increase in real power load due to application of a P-scale factor uniformly to all real power loads at PQ-nodes is distributed among all PQ-nodes randomly.

6. The method as defined in claim 1, wherein input data set is generated by application of a Q-scale factor uniformly to a base case reactive power loads at PQ-nodes, and increasing the Q-scale factor in pre-defined steps for creating other Q-scale factors for generation of other input data sets wherein application of the Q-scale factor uniformly means the same factor applied to the base case reactive power loads at all of the PQ-nodes, and the base case constitute when the Q-scale factor is 1.0.

7. The method as defined in claim 6, wherein total increase in reactive power load due to application of a Q-scale factor uniformly to all reactive power loads at PQ-nodes is distributed among all PQ-nodes randomly.

8. The method as defined in claim 1, wherein input data set is generated by application of a P-scale factor non-uniformly to a base case real power loads at PQ-nodes, and increasing the P-scale factor in pre-defined steps for creating other P-scale factors for generation of other input data sets wherein application of the P-scale factor non-uniformly means the factor is applied to the base case real power load at only one of the PQ-nodes at a time.

9. The method as defined in claim 8, wherein increase in real power load due to application of a P-scale factor non-uniformly to a real power load at a PQ-node is distributed to PV-node generators in proportion to their participation factors in the base case total of real power loads at PQ-nodes.

10. The method as defined in claim 8, wherein increase in real power load due to application of a P-scale factor non-uniformly to a real power load at a PQ-node is distributed to PV-node generators randomly.

11. The method as defined in claim 1, wherein input data set is generated by application of a Q-scale factor non-uniformly to a base case reactive power loads at PQ-nodes, and increasing the Q-scale factor in pre-defined steps for creating other Q-scale factors for generation of other input data sets wherein application of the Q-scale factor non-uniformly means the factor is applied to the base case reactive power load at only one of the PQ-nodes at a time.

12. The method as defined in claim 1, wherein input data set is generated by application of a R-scale factor uniformly to a base case branch resistances, and increasing the R-scale factor in pre-defined steps for creating other R-scale factors for generation of other input data sets wherein application of the R-scale factor uniformly means the same factor applied to the base case resistances of all of the branches in the power network, and the base case constitute when the R-scale factor is 1.0.

13. The method as defined in claim 1, wherein input data set is generated by application of a X-scale factor uniformly to a base case branch reactances, and increasing the X-scale factor in pre-defined steps for creating other X-scale factors for generation of other input data sets, wherein application of the X-scale factor uniformly means the same factor applied to the base case reactances of all of the branches in the power network, and the base case constitute when the X-scale factor is 1.0.

14. The method as defined in claim 1, wherein input data set is generated by application of a R-scale factor non-uniformly to a base case branch resistance, and increasing the R-scale factor in pre-defined steps for creating other R-scale factors for generation of other input data sets wherein application of the R-scale factor non-uniformly means the factor is applied to the base case branch resistance of only one branch at a time.

15. The method as defined in claim 1, wherein input data set is generated by application of a X-scale factor non-uniformly to a base case branch reactance, and increasing the X-scale factor in pre-defined steps for creating other X-scale factors for generation of other input data sets, wherein application of the X-scale factor non-uniformly means the factor is applied to the base case branch reactance of only one branch at a time.

16. The method as defined in claim 1, wherein input data sets are generated for simulation of branch outage contingencies by removing branch impedance contribution to $G_{pp}$, $B_{pp}$, $g_p$, and $b_p$ that appear in equations (3) to (10).

17. The method as defined in claim 1, wherein for each input data set an output data set is calculated by performing loadflow computation off-line by one of the classical known loadflow computation methods including NRL and SSDL, and output data set of dimension $2(n-1)+2m$ constitutes calculated values of voltage angles at PQ-nodes and PV-nodes, voltage magnitudes at PQ-nodes, reactive power generation at PV-nodes, V-stability margin and θ-stability margin at PQ-nodes, wherein n is the total number of nodes and m is the number of PQ-nodes in the power system.

18. The method as defined in claim 1, wherein real power loads at all PQ-nodes for a given input data set are noted, and output data set of voltage angle θ-stability margin of dimension m is determined by increasing real power only at one given PQ-node until one of the Conventional Loadflow Computation Methods-SSDL (CLCM-SSDL) diverges, noting increased real power just before divergence of CLCM-SSDL, taking difference of real power load just before divergence of CLCM-SSDL and real power load of the corresponding node in the given input data set that gives voltage angle θ-stability margin for the given PQ-node, and repeating the process for each of the m PQ-nodes for a given input data set.

19. The method as defined in claim 1, wherein reactive power loads at all PQ-nodes for a given input data set are noted, and output data set of voltage magnitude V-stability margin of dimension m is determined by increasing reactive power only at one given PQ-node until one of the Conventional Loadflow Computation Methods-SSDL (CLCM-SSDL) diverges, noting increased reactive power just before divergence of CLCM-SSDL, taking difference of reactive power load just before divergence of CLCM-SSDL and reactive power load of the corresponding node in the given input data set that gives voltage magnitude V-stability margin for the given PQ-node, and repeating the process for each of the m PQ-nodes for a given input data set.

20. The method as defined in claim 1 wherein solution of the ANN loadflow computation model uses an entropy reduction technique of a Suresh's diakoptics that determines a sub-network for each node involving directly connected nodes referred to as level-1 nodes and their directly connected nodes referred to as level-2 nodes wherein the level of outward connectivity for a local sub-network around a given node whose single variable is to be estimated using separate ANN is to be determined experimentally for deciding the number of inputs for the separate ANN that estimates the single variable of the given node.

21. A method of forming and solving an Artificial Neural Network (ANN) computation model of a system or a device using a general purpose computing apparatus comprising the steps of:
generating input and output data sets, that simulate feasible and continuous nonlinear operating region of the system or the device, by different multiplication factors, beginning 0.0 and increasing in predefined steps until solution of conventional mathematical model of the system or the device diverges, applied to base case load parameters and physical parameters of the system or the device described by simultaneous nonlinear equations,
using said generated input and output data sets in training, testing and validating, forming, and storing an ANN computation model of the system or the device,
solving said the stored ANN computation model of the system or the device.

* * * * *